United States Patent [19]

Buchalter et al.

[11] Patent Number: 4,572,656

[45] Date of Patent: Feb. 25, 1986

[54] MESSAGE QUE INTERACTIVE CONTROL CONSOLE

[75] Inventors: Neal S. Buchalter, Fairport; Henry E. Mannella, Webster; Robert A. Burkett, Fairport, all of N.Y.

[73] Assignee: Xerox Corporation, Stamford, Conn.

[21] Appl. No.: 89,433

[22] Filed: Oct. 30, 1979

[51] Int. Cl.[4] .............................................. G03B 27/52

[52] U.S. Cl. ...................................................... 355/24

[58] Field of Search .................................. 355/23-26, 355/14 C, 14 R, 3 R, 14 SH

[56] References Cited

U.S. PATENT DOCUMENTS

| | | | |
|---|---|---|---|
| 4,054,380 | 10/1977 | Donohue et al. | 355/14 R |
| 4,133,477 | 1/1979 | Marino et al. | 355/14 C X |
| 4,191,465 | 3/1980 | Boase et al. | 355/24 X |

OTHER PUBLICATIONS

IBM TDB, vol. 18, No. 10, 3/76, "Program Control of Job Control Information Entry for Copier".

Dutch Ser. No. 74.11641, filed 10/2/74, "Copier with Prioritized Diagnostics".

*Primary Examiner*—Gene Z. Rubinson

*Assistant Examiner*—W. J. Brady

*Attorney, Agent, or Firm*—Ronald F. Chapuran

[57] ABSTRACT

Backlit messages guide the operator through the process of making duplex copies in either a simplex to duplex or duplex to duplex mode. The queing or sequence of the messages will adapt to the order of operator activity or performance to instruct the operator on the next operation to be performed. Once certain operations are performed, some backlit messages are turned off. In particular the messages instruct the operator to determine if specific paper trays are empty, to suitably load a recirculating document handler, to remove copies from one tray and place in a second tray, and to reposition documents in the document handler.

1 Claim, 10 Drawing Figures

MESSAGE QUE INTERACTIVE CONTROL CONSOLE

This invention relates to a reproduction machine and in particular to a reproduction machine having a message que operator control console.

CROSS RELATED REFERENCES

For further information relating to this application, reference is made to the following companion U.S. patent applications filed concurrently herewith to the common assignee U.S. Ser. No. 089,334, now abandoned Sheet Registration in a Finishing Station; U.S. Ser. No. 089,335, now U.S. Pat. No. 4,304,485, Sheet Reversing Apparatus for a Copier/Finisher System; U.S. Ser. No. 089,336, now U.S. Pat. No. 4,313,670, Reproduction Machine with a Pivotal Stapling Device; U.S. Ser. No. 089,338, now abandoned, Sheet Transport by Multiple Speeds in a Copier/Finisher; U.S. Ser. No. 089,338, now U.S. Pat. No. 4,293,214, Sheet Set Separation Device; U.S. Ser. No. 089,339, now U.S. Pat. No. 4,299,478, Bound Document Apparatus for a Copier; U.S. Ser. No. 089,341, now U.S. Pat. No. 4,295,732, Bound Document Apparatus Latching Mechanism; U.S. Ser. No. 089,342, now abandoned, Reproduction Machine with Finishing Station; U.S. Ser. No. 089,333, now U.S. Pat. No. 4,281,920, A Stapler Arrangement for a Copier/Finisher; U.S. Ser. No. 089,428, now abandoned, Unlimited Catch Tray; U.S. Ser. No. 089,429, now abandoned, Cascade Illumination and Switch; U.S. Ser. No. 089,331, now U.S. Pat. No. 4,313,673, entitled Duplex Operation in a Reproduction Machine.

Prior art reproduction machines such as disclosed in U.S. Pat. No. 4,158,886 assigned to the same assignee as the present invention, generally teach the concept of various operator controls including push puttons and displays on an operator control console.

Other systems such as disclosed in U.S. Pat. No. 3,971,013 and 3,958,239 disclose touch operated keyboards or switch plates that can be coupled to a computer or matched to information displayed on a CRT tube. Other systems such as disclosed in IBM Technical Disclosure Bulletin, Volume 18, No. 10, 1976 show a program control of control information entry for a reproduction machine. In particular, the control panel is divided into entry program and display sections for interaction between the operator and the reproduction machine. The entry portion, for example, might progressively ask for job number, light or dark originals, reduction size, duplex operation. Numerical information is then entered or a yes or no key is activated in response. Other systems such as shown in laid open Dutch application Ser. No. 74.11641 teach the use of a diagnostic display unit with an instruction screen and prioritizing circuit to display the highest priority machine condition or fault signal.

A difficulty with many of the prior ar systems, however, is the cost of components such as a CRT display or the complexity of the control that may be required. Effective man/computer interaction is dependent upon efficient two way transmission between the operator and the control. It is important to have a fast and yet simple display to enable operations and messages to be easily understood.

It would be desirable to guide the operator with a limited number of messages at a time and to guide the operator in a step by step sequence and yet allow for different levels of operator skills. In other words, If the operator has already covered a particular step, it would be desirable to skip the message in the sequence of messages to be followed. The steps, preferably, could be covered in any order, as long as all the necessary steps were completed for the next operation.

It is therefore an object of the present invention to provide a new and improved operator console for interacting with the machine, in particular, to provide an operator console with selectively backlit messages to simplify the operator interaction.

Further advantages of the present invention will become apparent as the following description proceeds, and the features characterizing the invention will be pointed out with particularity in the claims annexed to and forming a part of this specification.

Briefly, the present invention is concerned with multitask button, cascade illumination and progressively backlit messages. In a particular embodiment, backlit messages guide the operator through the process of making duplex copies in either a simplex to duplex or duplex to duplex mode. The queing or sequence of the messages will adapt to the order of operator activity or performance to instruct the operator on the next operation to be performed. Once the operation is performed, the appropriate backlit message is turned off. In particular the messages instruct the operator to determine if specific paper trays are empty, to suitably load the recirculating document handler, to remove side one copies from one tray and place in a second tray, to reposition documents in the recirculating document handler.

For a better understanding of the present invention, reference numerals have been applied to like parts wherein.

Figure 1:
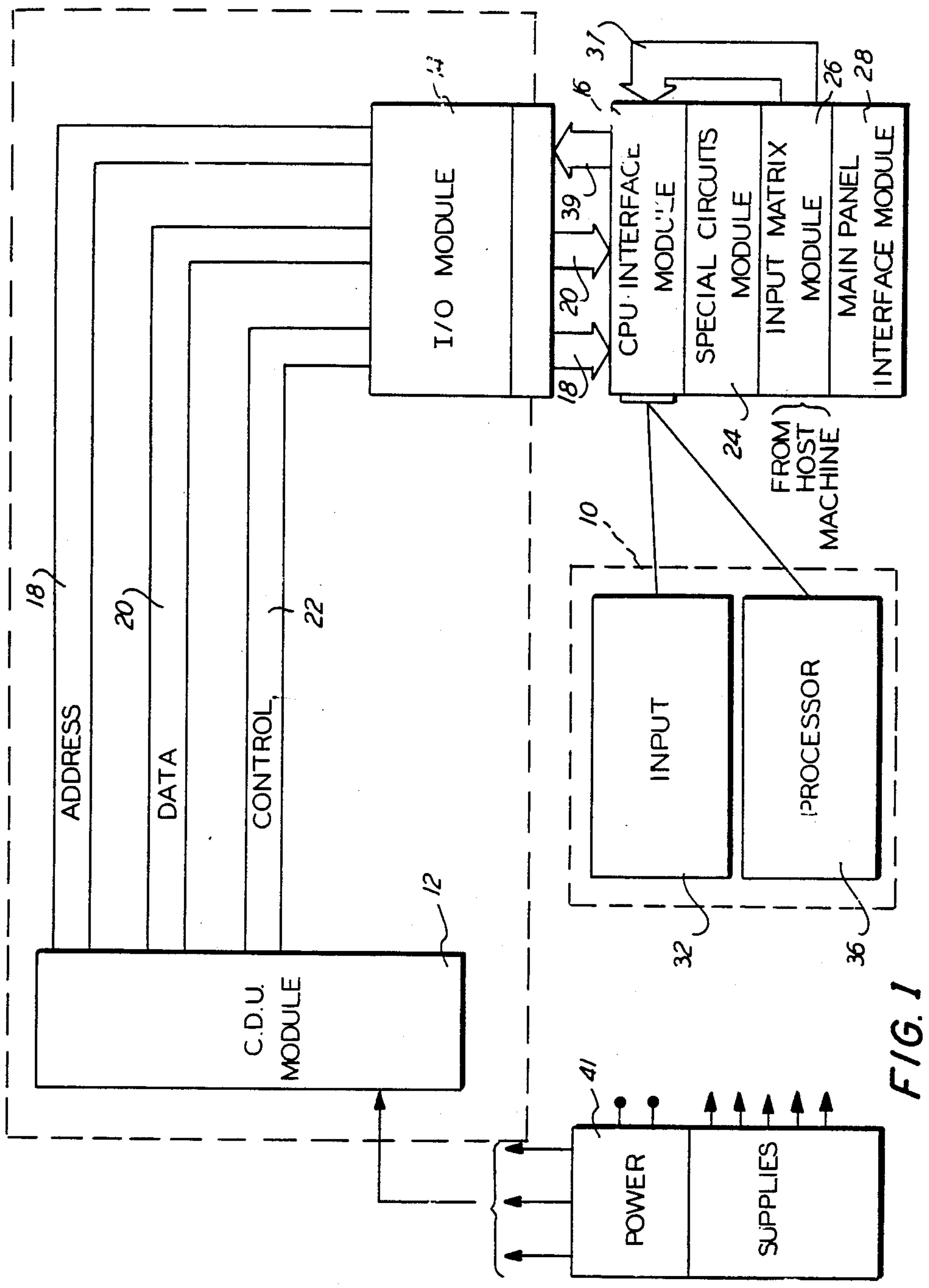
FIG. 1 is a block diagram of the controller incorporating the present invention.

Referring to FIG. 1, there is shown a reproduction machine 10 and a controller including a central processor unit (CPU) module 12, input/output (I/O) module 14 and CPU interface module 16. Address, data and control buses 18, 20 and 22 couple CPU module 12 and I/O module 14.

CPU interface module 16 connects the I/O module 14 with special circuits module 24, input matrix module 26 and main panel interface module 28. The CPU interface module 16 also interconnects I/O module 14 to the operating sections of the reproduction machine 10 namely, input section 32, and processor section 36.

Switch and sensor inputs are provided to the CPU module 12 from the machine from either the input matrix module 26 or the main panel interface module 28 via data buses 37 and 39. A power supply 41 is also interconnected to CPU module 12 as well as to other control elements.

For a more detailed description of the control, reference is made to U.S. Pat. No. 4,062,061, incorporated herein.

Figure 2:
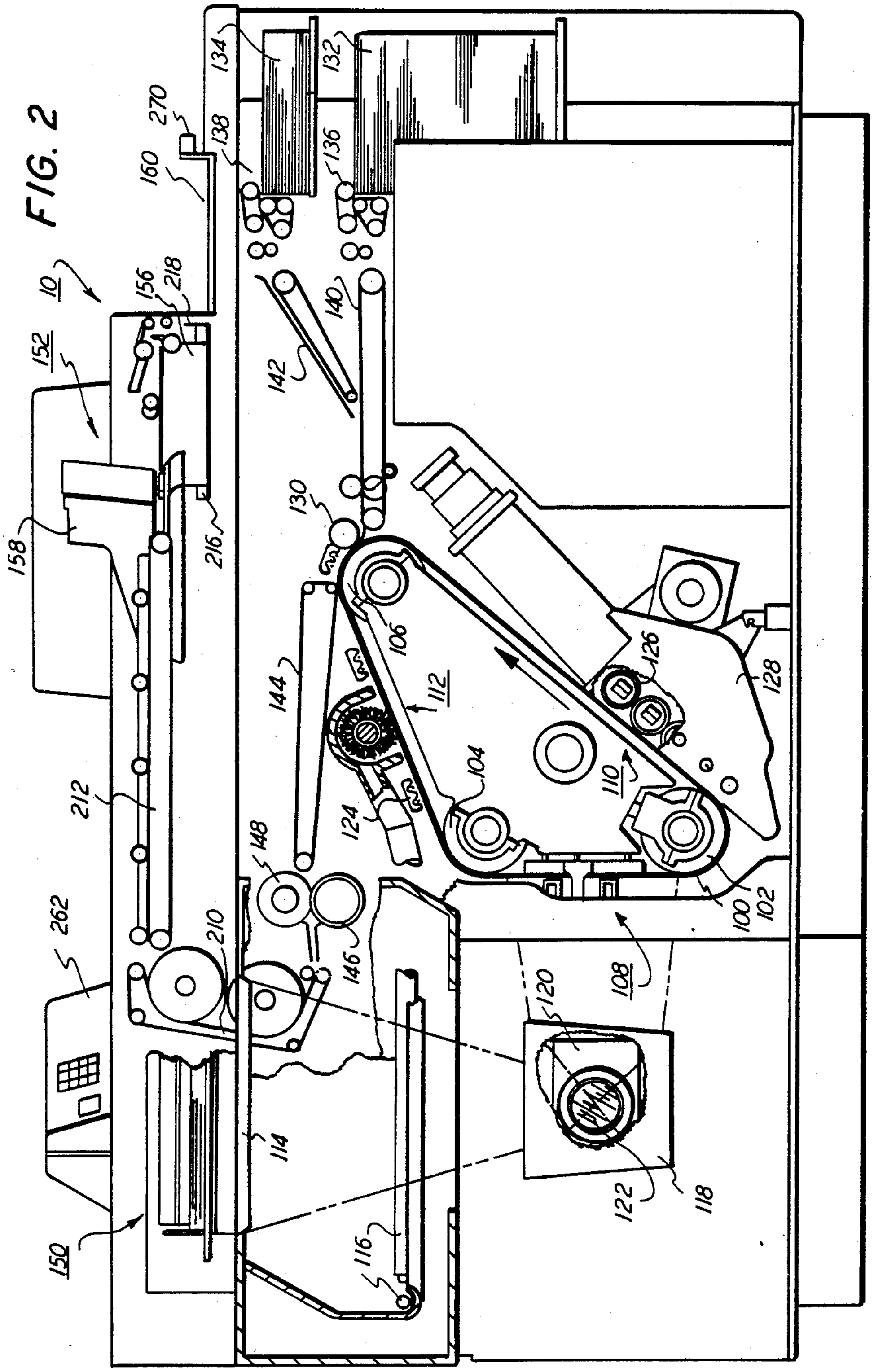
FIG. 2 is a cutaway elevational view of an exemplary reproduction apparatus incorporating the control system of FIG. 1.

Referring particularly to FIG. 2 of the drawings, there is shown, in schematic outline, an electrostatic reproduction machine or host machine, identified by numeral 10, incorporating the control arrangement of FIG. 1.

The machine 10 uses a photoreceptor in the form of an endless photoconductive belt 100 supported in generally triangular configuration by rolls 102, 104 and 106 and comprising a photoconductive layer of selenium, on a conductive substrate. Belt 100 is supported to provide substantially flat areas at exposure, developing, and cleaning stations 108, 110, 112 respectfully. The photoconductive belt 100 moves in the direction indicated by the solid line arrow, drive being provided through roll 106, in turn driven by a not shown main drive motor.

Machine 10 includes a generally rectangular, horizontal transparent platen 114 on which each original or document to be copied is disposed. A two or four sided, illumination assembly 116, disposed below and along at least two sides of platen, is provided for illuminating the original on platen 114. The light image generated by the illumination system is projected via mirrors 118, 120 and a variable magnification lens assembly 122 onto the photoreceptor belt 100 at the exposure station 108. To prepare belt 100 for imaging, belt 100 is uniformly charged to a preselected level by charge corotron 124. Magnetic brush rolls 126 are provided in a developer housing 128 at developing station 110. The bottom of housing 128 forms a sump within which a supply of developing material is contained.

To transfer developed images from belt 100 to the copy sheets, a transfer roll 130 engages copy sheets driven from either main or auxiliary tray 132, 134 by main and auxiliary sheet feeders 120, 121, respectively. Paper is generally fed from the main tray 132. Main transport 140 extends from main paper tray 132 to transfer roll 130 and is driven from the main motor. Auxiliary transport 142 extends from auxiliary tray 134 to main transport 140 and is also driven from the main motor. The image bearing sheets leaving the nip formed by photoconductive belt 100 and transfer 130 are picked off by vacuum transport 144 and conveyed to the fuser having a lower heated fuser roll 146 and upper pressure roll 148.

The reproduction machine 10 also includes a recirculating document handler (RDH) shown generally at 150 and a finishing station shown generally at 152. The recirculating document handler 150 shown in detail in FIG. 3 feeds originals automatically into platen 114 from tray 154. The machine 10 can make multiple collated sets of originals by successively feeding and removing originals from the platen 114. A manual input station is also provided to place an original under platen 114.

The finisher 152 contains a compiler tray 156, a stapler 158 and an offsetting catch tray 160. In the non-collation or stacks mode, successive, identical copy sheets are fed directly through the finisher 152 to the offsetting catch-tray 160. In the collation (RDH) or sets mode, successive, non-identical copy sheets are fed into the compiler tray 156 and compiled until the completion of the set. At this time the set is stapled or not stapled as required, and ejected to the offsetting catch-tray 160. The offsetting catchtray 160 offsets between successive sets to maintain set integrity. A list of possible combinations between document input, copy, and output format is shown in Table I.

TABLE I

LIST OF AVAILABLE MODE COMBINATIONS

| Document Input | Copy | Offset Outputs |
|---|---|---|
| Manual Platen | 1/Sided Copy/Main Fd | Stacks |
| Manual Platen | 1/Sided Copy/Aux Fd | Stacks |
| Auto Feed/1 Sided Doc | 1/Sided Copy/Main Fd | Sets |
| Auto Feed/1 Sided Doc | 1/Sided Copy/Main Fd | Stapled Sets |
| Auto Feed/1 Sided Doc | 1/Sided Copy/Aux Fd | Sets |
| Auto Feed/1 Sided Doc | 1/Sided Copy/Aux Fd | Stapled Sets |
| Auto Feed/1 Sided Doc | 2/Sided Copy/Main Fd | Sets |
| Auto Feed/1 Sided Doc | 2/Sided Copy/Main Fd | Stapled Sets |
| Auto Feed/1 Sided Doc | 2/Sided Copy/Aux Fd | Sets |
| Auto Feed/1 Sided Doc | 2/Sided Copy/Aux Fd | Stapled Sets |
| Auto Feed/2 Sided Doc | 2/Sided Copy/Main Fd | Sets |
| Auto Feed/2 Sided Doc | 2/Sided Copy/Main Fd | Stapled Sets |
| Auto Feed/2 Sided Doc | 2/Sided Copy/Aux Fd | Sets |
| Auto Feed/2 Sided Doc | 2/Sided Copy/Aux Fd | Stapled Sets |
| Auto Feed/1 Sided Doc | 1/Sided Copy/Main Fd | Stacks |
| Auto Feed/1 Sided Doc | 1/Sided Copy/Aux Fd | Stacks |

Figure 3:
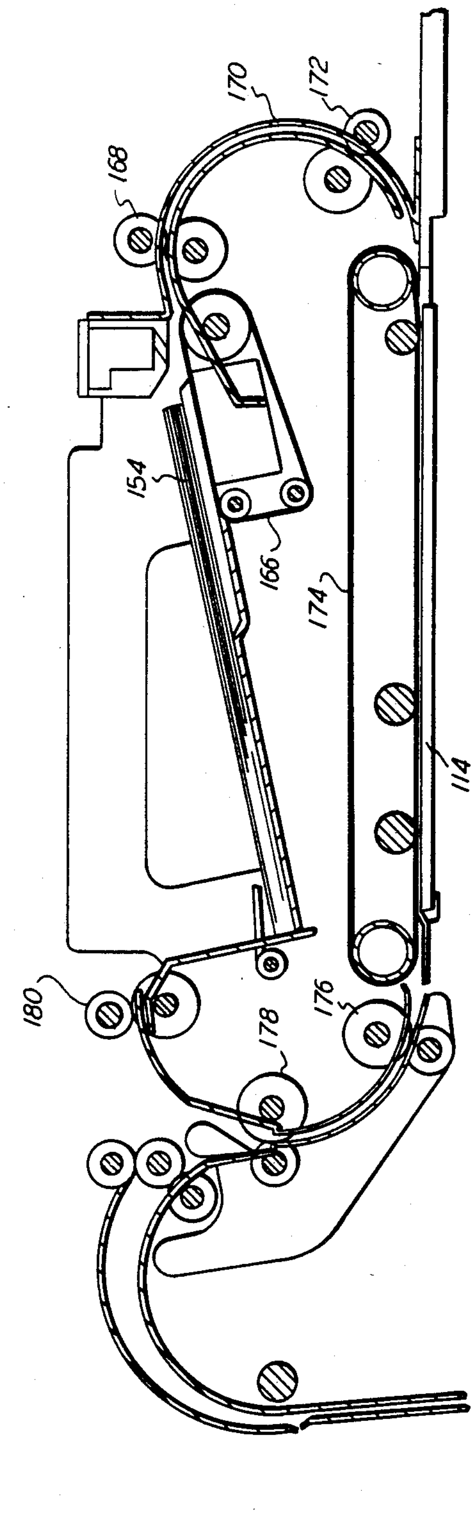
FIG. 3 is an elevational view of the recirculating document handler of the reproduction apparatus shown in FIG. 2.
Figure 4:
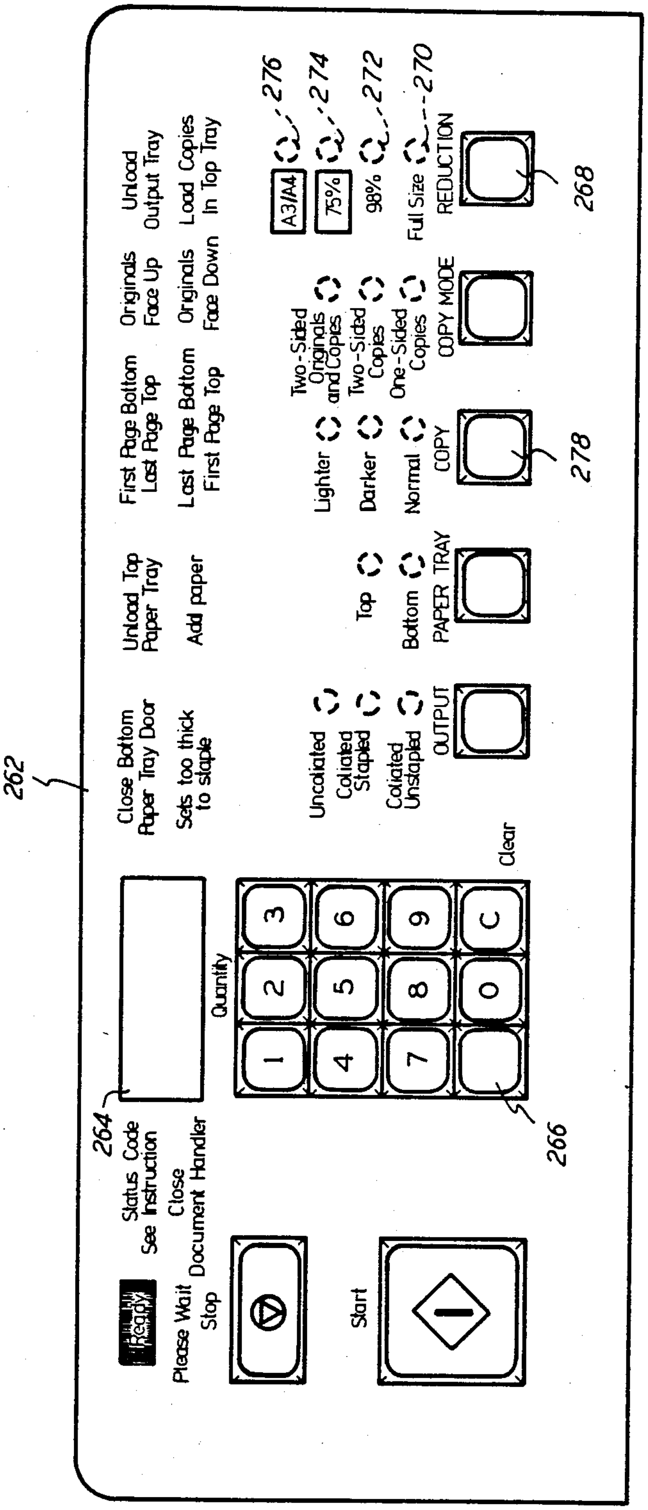
FIG. 4 is a detailed illustration of the operator control console shown in FIG. 2.
Figure 5:
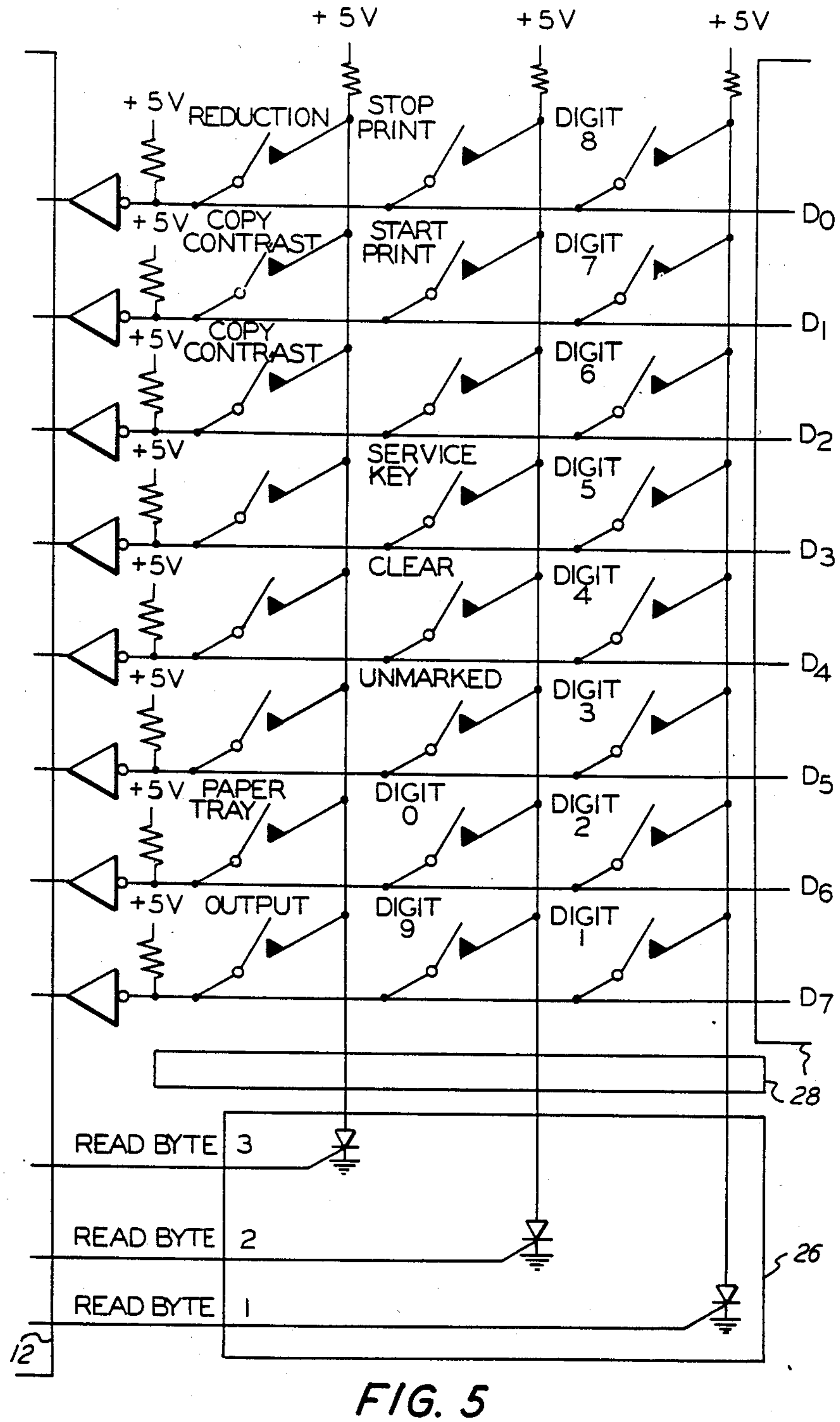
FIG. 5 is a schematic illustration of the interconnection of the push button switches shown in FIG. 4 with the controller of FIG. 1.

With reference to FIGS. 3 and 4 for the RDH 150 mode and one sided documents and copies, the operator programs the machine and places the originals in the RDH tray 154 face up (1 to N).

Documents are driven one at a time in N to 1 sequence from the bottom of the set in tray 154 by feeder belt 166 to tray takeaway rollers 168. The platen entry rollers 172 drive the document into engagement with platen belt 174 for movement onto platen 114 into synchronism with the movement of the preceding document off platen 114.

After exposure, documents are driven off platen 114 by platen belt 174 into engagement with return transport rollers 176. The documents are conveyed to middle rollers 178 to tray entry rollers 180 for return to tray 154. The reproduction machine develops and delivers each copy in sequence face up to the catch tray 160. Complete sets of N copies each are offset in tray 160 and if the staple mode is selected the sets are stapled.

For one sided originals/two sided copies, in the first pass, the operator places the document in the RDH tray 154 face up in reverse order and presses Print. The RDH advances each original in sequence and the even originals are flashed in (2—N) sequence. If the set has an odd number of pages, the machine processor passes a blank sheet at the end of each set. There is no precount of documents by the RDH and there is one flash per two document feeds. The machine processor feeds a copy every other pitch or copy cycle. Skipped pitches are faded out with a pitch fadeout lamp. The copies are delivered to output tray 160 face up in descending order. That is

| | |
|---|---|
| 8 | (or blank if odd number of originals) |
| 6 | |
| 4 | |
| 2 | |

The blank sheet is not billed and the tray 160 does not offset the set. Stapling, if selected, is inhibited during this pass. In the second pass, the operator removes the documents and reorders them into the original order, loads the RDH tray 154, moves the half-copies to the auxiliary feed tray 134 and presses Print. The RDH 150 operation is the same as first pass except odd documents are flashed (N−1). Again there is one flash per two feeds. The one side or half-copies are then conveyed from feed tray 134 via transport 142 to transfer roll 130 to receive a second side image. The machine processor operation is the same as the first pass except copies in the output tray 160 are in the correct order and the sets are offset. If selected, stapling of the sets is accomplished at this time. That is, the copy sheets for one complete set are accumulated in compiler tray 156, stapled and then ejected to the catch tray 160.

For the RDH 150 mode and two sided originals/two sided copies, in the first pass, the operator places the documents face down into RDH tray and presses Print. The RDH advances each document in 1−N sequence and flashes the back side of each document once per copy. There is one flash per feed. The machine processor develops and delivers each copy in sequence to the output tray 160 with one pitch skipped between sets. There is no offset of copies nor stapling. In the second pass, the operator flips the stack of documents over in the RDH tray 154, moves the half-copies from the output tray 160 to the auxiliary feed tray 134, and presses Print. The RDH operates the same as first pass except front sides are flashed in (N−1) sequence (one flash-/feed). The machine processor operation is the same as first pass except copies are in correct order and the sets are offset in the output tray, and if selected, the sets are stapled.

For the RDH mode of operation and stacked or uncollated copies, the operator places the documents face up in the RDH, programs the machine and presses Print. The machine makes the total quantity of copies programmed of the bottom document, delivers them to output tray 160 (does not compile) and shifts the tray after the last copy of each document is delivered. The RDH 150 indexes to the next document and resumes copying. The job output is offset stacks.

For manual operation, the operator places the document or book on platen 114 and presses Print. The machine makes the required copies, stacks them directly in the output tray 160 (not copiled), stops, shifts the tray and displays Ready.

Figure 6:
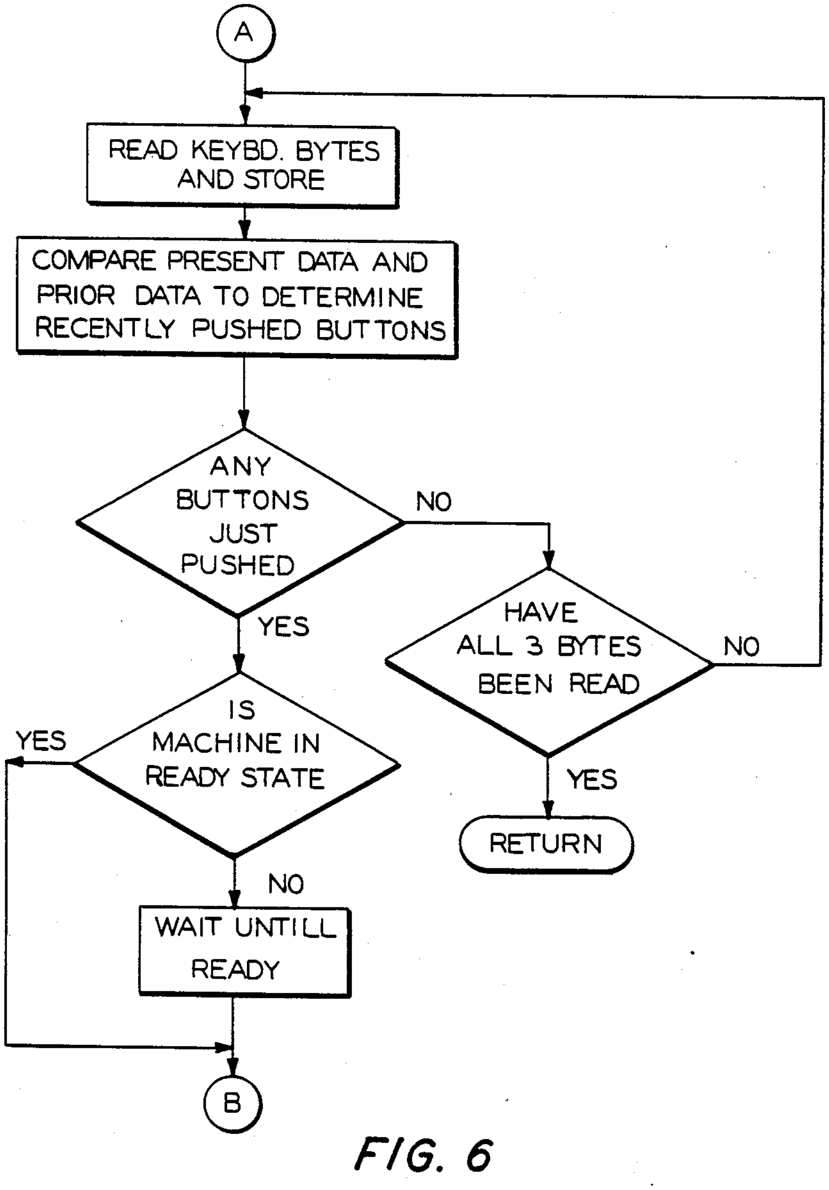
FIGS. 6 and 7 are a flow chart of the switch scan procedure of the controller disclosed in FIG. 1.
Figure 7:
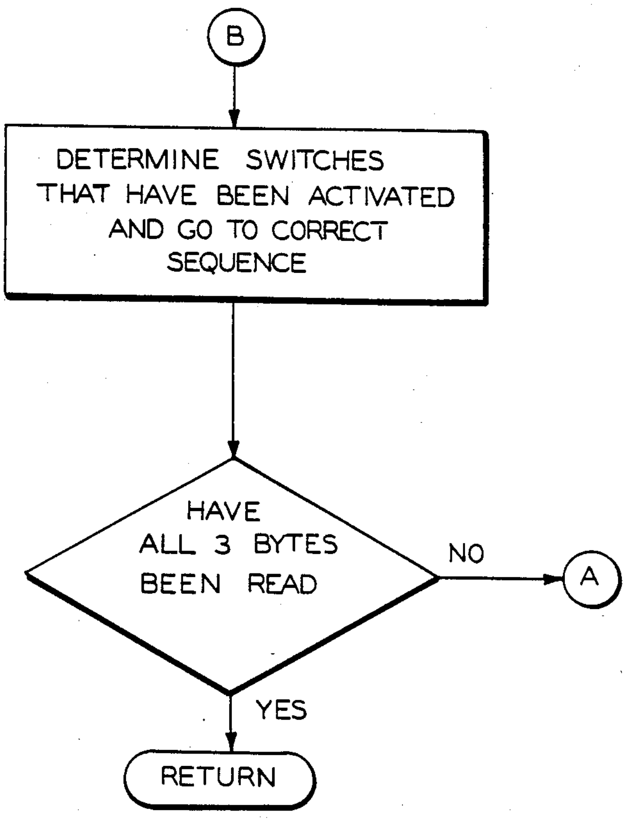

With reference to FIGS. 4 and 6, there is shown the operator's control console 262 including various inputs switches and indicator lamps. The interconnection of these switches and the main panel interface module 28, the input matrix module 26 and the CPU module 12 are illustrated in FIG. 7. Of course all connections to the CPU module are through the input/output module 14.

The console switches are continuously monitored by a switch scan procedure to initiate the correct operation for a particular combination of switch inputs. The inputs from the twenty console switches are arranged into three bytes of information as set forth below in Table II.

TABLE II

| | BIT POSITIONS | | | | | | | |
|---|---|---|---|---|---|---|---|---|
| | D7 | D6 | D5 | D4 | D3 | D2 | D1 | D0 |
| Keybd Byte 1 | Bit 1 | Bit 2 | Bit 3 | Bit 4 | Bit 5 | Bit 6 | Bit 7 | Bit 8 |
| Keybd Byte 2 | Bit 9 | Bit 0 | Bit Un-Marked | Bit Clear | Bit Serv. Key | Bit | Bit Start Print | Bit Stop Print |
| Keybd Byte 3 | Out-Put | Paper Tray | | | | Copy Con-trast | Copy Mode | Reduc-tion |

Figure 8:
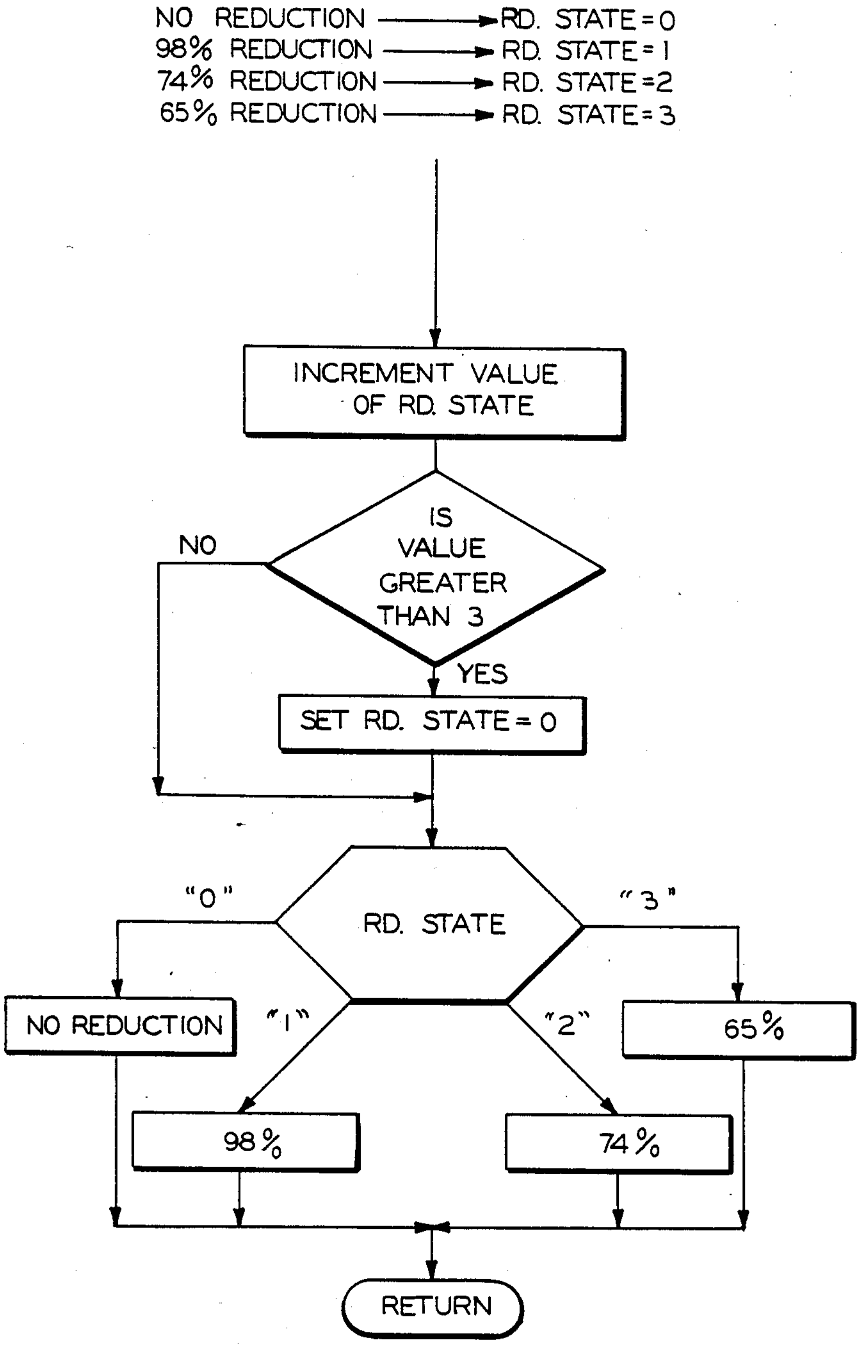
FIG. 8 is a flow chart of the multitask button cascade illumination feature of the present invention.
Figure 9:
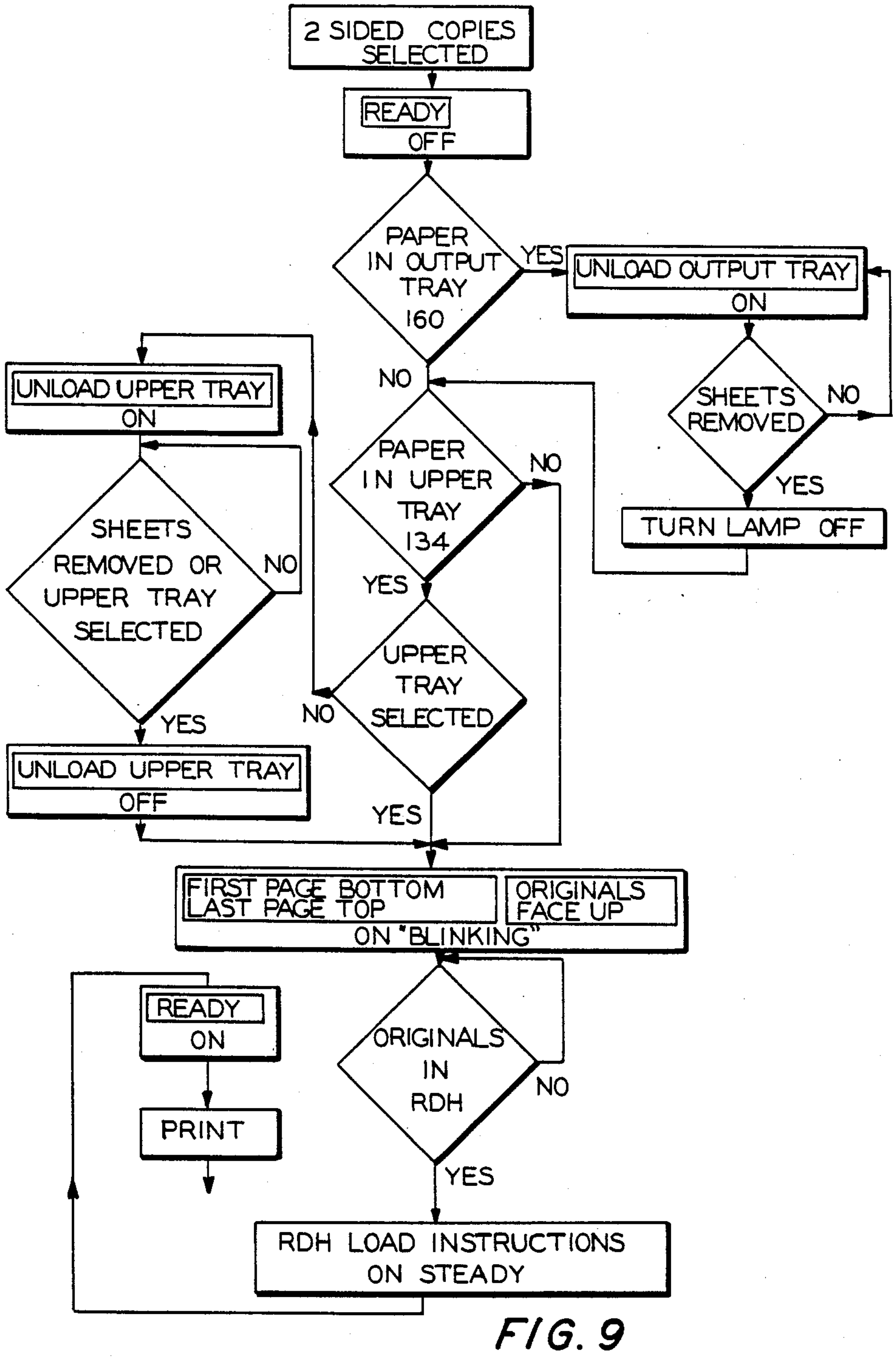
FIGS. 9 and 10 are flow charts of the message queing and duplex operation according to the present invention.

The switch scan procedure is shown in the flow charts of FIGS. 8 and 9. In particular, the scan is made every 20 milliseconds and in an effort to filter out noise, two readings of the byte are taken approximately 13 microseconds apart. If they are the same, a third reading is not required. If they are not the same, the result of a third reading taken approximately 13 microseconds later is used.

The machine is generally operating in one of eight different states namely an initialization, lamp test, run not print, print, ready, not ready, tech rep, and component control states. The system can be executing in only one state at a time. The system operates in a state until it recognizes a condition requiring a state change.

The initialization state is completed after a system self-test or system self diagnostics and in this state various flags and data are set to initial values required for system operation. In accordance with one feature of the present invention, the system enters the lamp test state and in this state turns on all front panel lights and indicates 8888 on the digital display 164 for an automatic lamp test feature. There is a short, approximately 5 seconds, display of all the front console lamps. This occurs shortly after power is turned on. This provides an indication to the operator of any burned out or otherwise inoperative display components. This also eliminates the need for a button to request the display. It should also be understood that as machine performance is monitored over a history of use, various changes are often required to the systems software to optimize operation. Generally these changes are made in various stages. Therefore for diagnostic and evaluation purposes it is often desirable to know the particular stage or level of software in the system. This information is available in the digit display 164 during this period of lamp tests by keying the unmarked push button 166 on the operator's console. A coded display will indicate the level of software in the system.

After the lamp test state, the system, at the expiration of the 5 seconds, enters the not ready state. There are approximately 11 conditions that must be satisfied before the system changes from the not ready to the ready state. For example, the lens selection must equal the lens position switch, that is, the lens must not be in motion, the bottom and top trays if selected must have enough paper, the fuser must be up to temperature, all stand by interlocks must be closed, the fuser must not be over-temperature, the photoreceptor belt must not be mistracked, all fault codes must be cleared, if RDH is selected it must not be in a jam condition, the offset catch tray 160 must not be full or the capacity cannot be exceeded, and the offset catch tray 160 must be emptied if two sided copy mode is selected.

The system next enters the ready state upon satisfying the not ready conditions and then is ready to enter the print state. From the ready state the system will normally go either to the print state back to the not ready state or to the tech rep state if required. Upon activation of the print button the system enters the print state. Upon completion of the reproduction run, or upon encountering a machine malfunction, the system exits from the print state to a run/not print state. After the completion of this state there is entered a not ready state.

The tech rep state is entered when the service key is on, the system is in not ready or ready state, and the display select and clear buttons are depressed simultaneously. This allows the tech rep to access programs not otherwise available, such as diagnostic programs.

In the various states, except the initialization state and the tech rep states, the machine or controller is generally performing housekeeping and systems operations. There are also provided a priority of interrupts to alert the controller of the reproduction machine events and requirements and to synchronize the controller and the reproduction machine. The events and requirements of the reproduction machine 10 generally require high speed response and to facilitate the response a multiple interrupts system is provided.

There are two external interrupts in particular a pitch reset interrupt and a machine clock interrupt. The pitch reset is the highest priority interrupt and is generated by a not shown reset switch synchronous with potential copy sheet registration in the reproduction machine. The interrupt initiates the resetting of various clocks and timed events for correctly operating on images and copy sheets in various stages in the process. The interrupt occurs only while the main motor is running and normally at a frequency of 1.25 Hz.

The second level of interrupt is the machine clock interrupt and is initiated by the machine clock pulses generated by a not shown magnetic pickup on the main drive motor. It performs the functions of scheduling and controlling events in synchronization during the print state and schedules and controls register output data to the reproduction machine components during all states of operation. A third interrupt, although a non-external interrupt, is a real time clock interrupt. This is the lowest priority interrupt used and the clock signals are produced by the controller clock to decrement several uniquely assigned memory cells at predetermined intervals. For a more detailed discussion of the overall operation of the controller, reference is again made to U.S. Pat. No. 4,062,061, incorporated herein. The control console 262 is generally organized into signal push button cascaded displays. For example, the reproduction machine 10 in normal operation will produce full size copies unless the "reduction" button 268 is pressed. In other words, in system ready at start up, the lens 122 is in position for full size copying and the full size lamp 270 on console 262 is illuminated. However, upon actuation of the reduction button 268, the lens 122 will next position itself for 98% reduction with the corresponding lamp 272 illuminated. The next activation of the reduction button 268 will initiate the movement of the lens to the 74% reduction position with the corresponding lamp 274 illuminated, and similarly the system is moved to the 65% reduction and lamp 276 illuminated upon activation of button 268. The next activation of button 268 will return to a full size illumination.

Similarly, the operator may select normal, dark, or light output by successive actuation of the copy push button. As described, the successive pressing of push button 278 causes the controller to acknowledge by illuminating appropriate lamps and stepping from one selection to another in a wrap-around sequence. This stepping operation is allowable even while the system is making copies. However, the controller performs an immediate response and also set up a deferred action. In other words, the immediate task, that is the stepping of the Illuminated lamps occurs immediately to provide operator feedback. The deferred action, for example, is the movement of the lens or adjustment of the developer bias and adjustment of the lens iris opening for darker or lighter copies. The deferred action will be performed if there are no additional button actuations within a certain time period, for example, approximately 1 second. The delay is necessary to prevent needless dithering of the controller until the correct mode has been selected.

Figure 10:
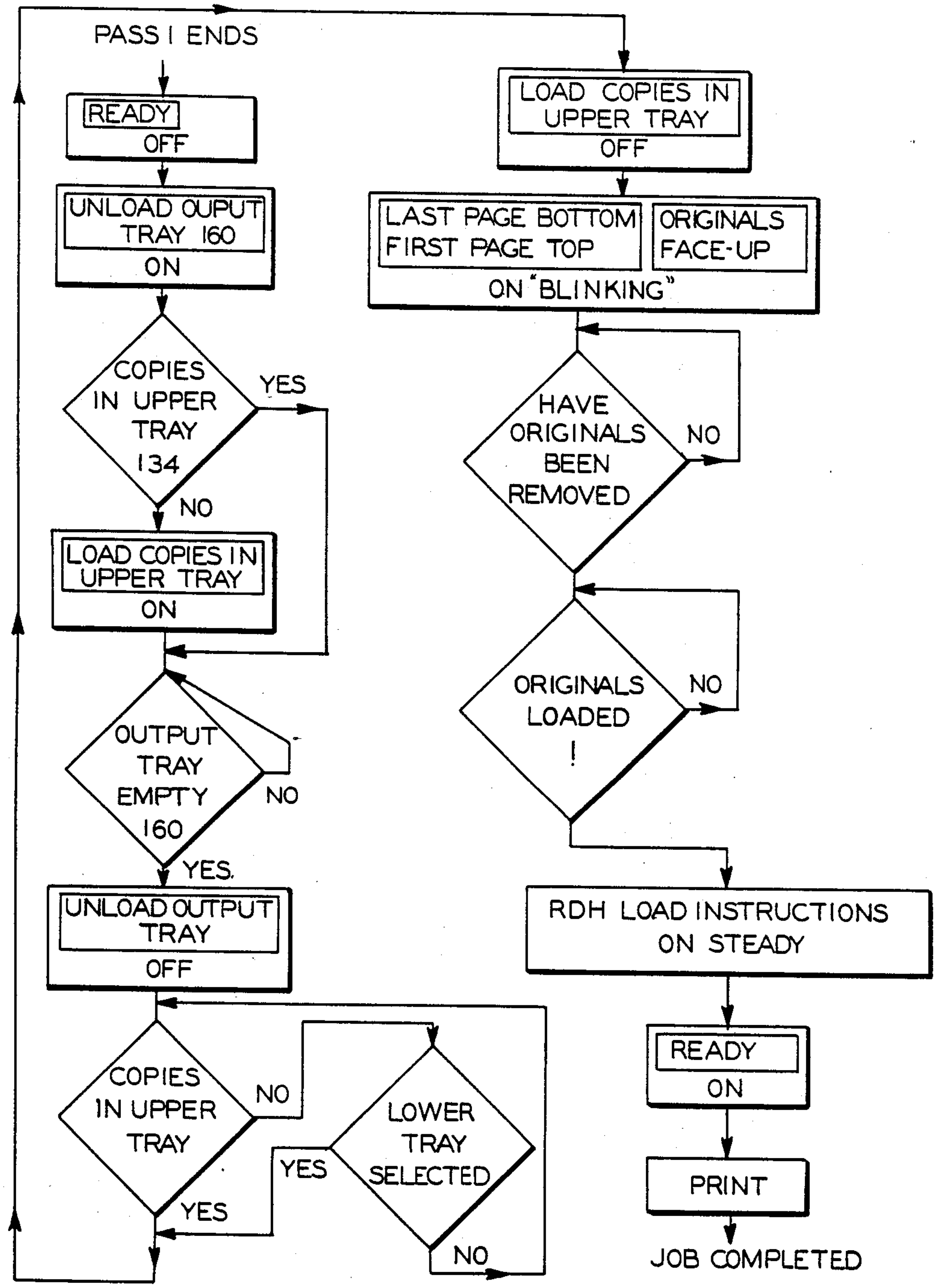

The multi-task button, cascade illumination feature is further described with respect to the reduction operation with reference to FIG. 10. In particular, the reduction operation is determined by the count in a reduction state counter (Rd STATE). Counts of zero, one, two, and three correspond to no reduction, 98% reduction, 74% reduction and 65% reduction respectively. The counter is incremented in response to successive actuations of the reduction push button 268, with an initial state of zero or no reduction before any activation of the push button.

The sequence is merely to increment the counter in response to activations of the push button 268. In FIG. 10, the first decision block is to determine if the counter is greater than three, and if so to reset the counter to zero. The contents of the counter are then scanned and for a particular counter number a particular reduction mode is initiated. The switch scan is constantly monitoring the various switches in the machine and checking for changes caused by switch actuation.

As an example of reduction, assume that the counter is in the zero state and the reduction button is keyed twice for a 74% reduction. The activation of the button will be detected by the main panel interface module 28 and the input matrix module 26. The CPU module 12 will recognize the mode selected and set an appropriate flag, in this case, the 74% reduction flag and illuminate lamp 274. While this operation is being executed, the switch scan routine will continue to monitor the various switches for the possibility of a new mode selected or the 74% reduction having been cleared. If it is determined that the 74% reduction remains selected, the lamp 274 remains illuminated and it is determined that a new lens position is required. A determination is made of the current position of the lens and the lens drive motor is activated to drive the lens to the appropriate 74% reduction position. At the appropriate position, the wait light is turned off and the ready light turned on.

In accordance with the present invention, the control console 262 includes ten selectively illuminated lighted displays to assist the operator in operating the reproduction machine. In particular, the messages are Close Lower Paper Tray Door, Sets Too Thick To Staple, Unload Upper Paper Tray, Add Paper, First Page Bottom Last Page Top, Last Page Bottom First Page Top, Originals Face Up, Originals Face Down, Unload Output Tray, and Load Copies In Upper Tray. Most of these messages are primarily used to guide the operator through the process of making duplex copies in either a simplex to duplex or duplex to duplex mode. Some are used for other instructional purposes.

Although these messages are normally displayed in predetermined sequences or queues, the operator may perform operations appropriate to the duplex mode chosen in different or alternative order. In this case, queuing or sequence of the messages will adapt to the order of operator activity or performance. In any case, the queuing message is displayed or illuminated until the sensors detect that the appropriate action has been taken.

In other words, it is desirable to guide the operator with a limited number of messages at a time and to guide the operator in a step by step sequence. However, it is not necessary to follow the messages exactly. If the operator has already covered a particular step, it is skipped in the sequence of messages. The steps can be covered in any order as long as all necessary steps are completed for the next operation.

The operator is guided by appropriate backlit instructions as illustrated with reference to the flow chart shown in FIGS. 9 and 10. In particular, assume that the operator requires a single side document two sided copies mode. The operator will press the "Copy" button once to change from one sided copies to two sided copies.

The procedure referred to as "Pass 1", shown in FIG. 9 initially checks whether or not the output or catch tray 160 and the upper tray or auxiliary feed tray 134 are empty. If there is paper in the output or catch tray 160, the operator is instructed by the illuminated message "Unload Output Tray" on the control panel 262 to unload the output tray 160. Once the copies are unloaded the message lamp is turned off. The upper paper tray (auxiliary feed tray) 134 is also checked and if there is paper in the upper paper tray 134, the operator is instructed by the message "Unload Upper Paper Tray" to unload the upper paper tray (auxiliary feed tray) 134. Once the sheets have been removed from the upper paper tray 160, the message lamp is turned off as with the output tray message.

It should be noted that if the upper paper tray 134 has been selected for feeding paper, the "Unload Upper Paper Tray" message will not be illuminated and the operator will not be instructed to unload the upper paper tray. Another check is also made to determine if there are documents in the RDH.

Assuming the output and upper trays are empty, two more messages are illuminated in an on-off or blinking manner, in particular the "First Page Bottom, Last Page Top" message and the "Originals Face Up" message.

"The First Page Bottom, Last Page Top" and "Originals Face Up" messages (RDH load instructions) instruct the operator on how to place the documents to be copied in the RDH. The system will then monitor that there are documents in the RDH and it is assumed that the documents are in fact in the correct format. The RDHload instructions then remain on in a steady state. At this point the Ready lamp is illuminated if all conditions for ready are met and the operator activates Start Print. The machine then runs the first pass, that is copies the even numbered documents and delivers the copies to the output tray 160 for as many sets as required up to the tray capacity. At this point there is no offset of the sets nor any stapling. If the run length should cause the pass "1" copies to exceed the capacity of the output tray, the job is automatically broken up into tray-sized segments, each with a "Pass 1-Pass 2" sequence until the full job is completed or cancelled by the operator.

At the completion of the first pass, the system enters into the pass "2" sequence as illustrated in FIG. 10. In particular, the Ready lamp goes off and if the upper tray 134 has not been previously selected, it is automatically selected at this point by the controller. This is necessary because the side one copies will be loaded into and fed from the upper paper or auxiliary feed tray 134. At this time also all the duplex message lamps will be turned off. The "Unload Output Tray" message and the "Load Copies in Upper Tray" message will then be illuminated. Once the operator empties the output tray 160, the "Unload Output Tray" message will shut off and as soon as the operator loads the side one copies into the upper tray 134, the "Load Copies in Upper Tray" will be turned off.

The "Last Page Bottom, First Page Top" message and the "Original Face Up" message (RDH load instructions) will then be illuminated on the control console. This instructs the operator on how to reposition the documents in the RDH. Once the documents have been removed and replaced, it is assumed that the documents are in the correct order and the ready lamp is illuminated for another print cycle. If the documents have not been removed and replaced, the RDH load instruction messages that is the messages relating to RDH operation, will flash in an on-off manner. Once removed and replaced, however, the RDH load instruction remain on in a steady condition and the machine completes the duplex operation.

The operation is similar for a duplex to duplex operation except instead of the "Original Face Up" message there is an "Original Face Down" message for pass 1. For pass 2, the "Original Face Up" message will be illuminated for RDH operation, operation instruction.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a reproduction machine having a document handler, a paper tray, an operator console having a number of selection switches for performing a plurality of machine operations including duplex operation and providing a plurality of displayable messages, the method of sequentially instructing the operator in operating the reproduction machine including the steps of:

selecting the duplex mode of operation, instructing operator action by a particular message display with regard to the paper tray, inhibiting the display upon operator action, instructing the operator with regard to documents in the document handler by another message display, inhibiting the display upon operator action, again instructing the operator with regard to the paper tray, inhibiting the display upon operator action, and again instructing the operator with regard to documents in the document handler by an on-off instruction if the operation has not been performed and by a steady state instruction if the operation has been performed.

* * * * *